United States Patent [19]

Canal

[11] 4,149,749
[45] Apr. 17, 1979

[54] ROOF LINING ELEMENT FOR VEHICLE CABINS

[75] Inventor: Romano G. Canal, Magliaso, Switzerland

[73] Assignee: EXACON International-Establishment, Vaduz, Liechtenstein

[21] Appl. No.: 806,775

[22] Filed: Jun. 15, 1977

[30] Foreign Application Priority Data

Feb. 11, 1977 [CH] Switzerland .......................... 1668/77
Mar. 16, 1977 [CH] Switzerland .......................... 3269/77

[51] Int. Cl.² .............................................. B60J 3/02
[52] U.S. Cl. ............................ 296/97 R; 296/137 R
[58] Field of Search ............... 296/84 N, 97 B, 97 G, 296/84 K, 137 R, 137 E, 137 F, 137 G, 97 R; 280/749, 751, 753

[56] References Cited

U.S. PATENT DOCUMENTS 2,733,763  2/1956  Nygaard ........................... 296/97 G
3,188,112  6/1965  Oelkrug ............................. 296/97 R Primary Examiner—Philip Goodman

[57] ABSTRACT

A roof lining element for cabins of automotive vehicles, notably automobiles, to reduce collision hazards in the head region of the driver or other vehicle occupants, the roof lining element comprising a substantially self-supporting integral structure including a frame for mounting said element near an interior surface of a roof portion of said cabin, and a frame cover means firmly connected to said frame; said frame including means for receiving and guiding at least two light screens or visors movable between an inoperative retracted position within said roof lining element and an operative extracted position; said frame cover means consisting at least in part of a shock-absorbing material and substantially covering the bottom side of said frame for providing in the head region of cabin occupants an impact-protecting surface free from protruding parts of any functional devices.

14 Claims, 10 Drawing Figures

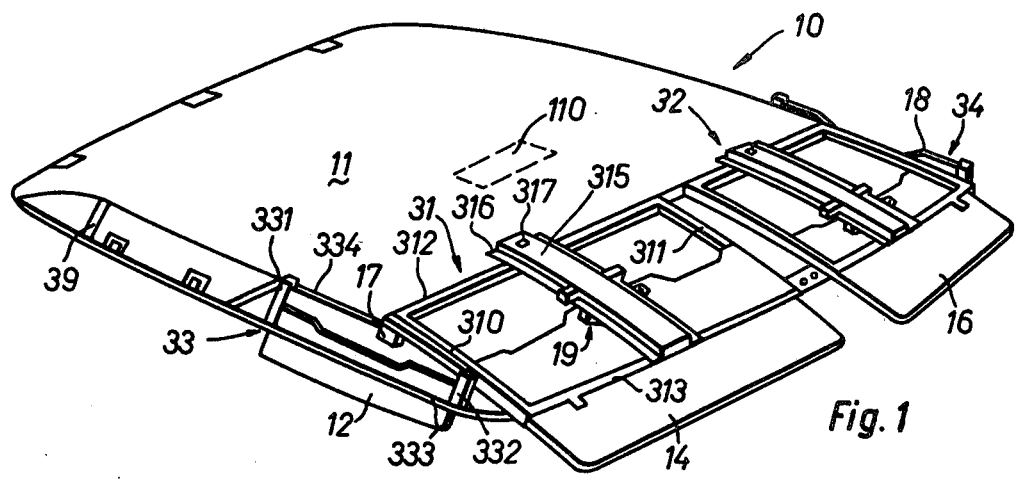
Fig. 1
Fig. 1a
Fig. 1b
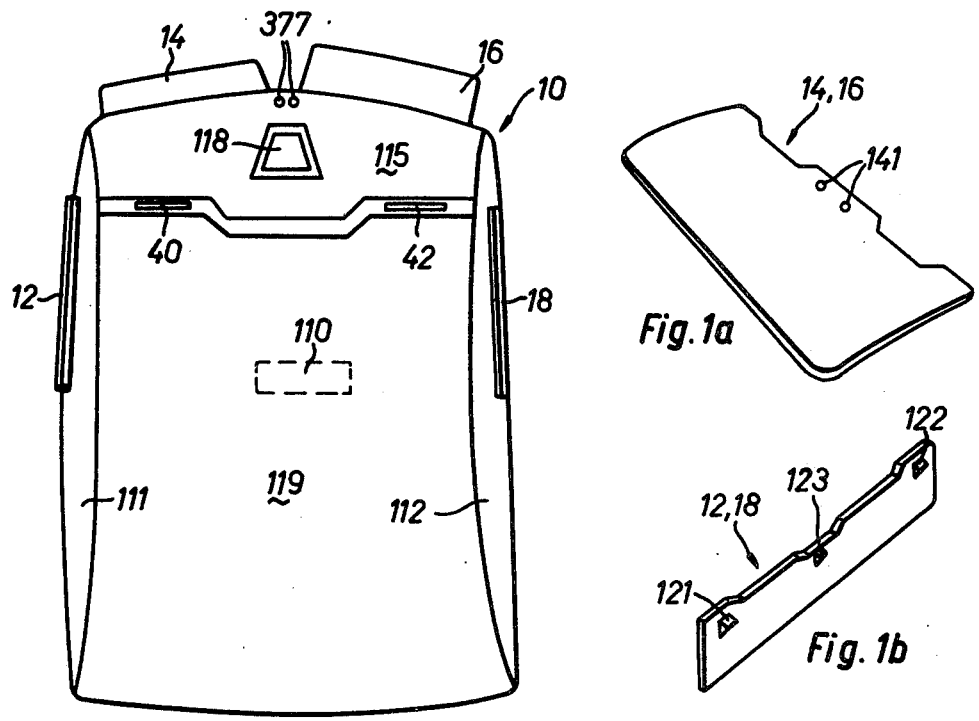
Fig. 2

ROOF LINING ELEMENT FOR VEHICLE CABINS

BACKGROUND OF THE INVENTION

1. Field of the Invention

This invention relates to improvements of the interior structure of automotive vehicles, notably automobiles, in the head region, that is, the area or areas near the head of one or more of the vehicle occupants, such as typically the interior surface of the roof of the vehicle cabin.

Automotive vehicles, such as automobiles, vans, freight cars or trucks, buses and the like, generally comprise a cabin capable of seating two or more passengers, one of which is the driver. It is well known that the interior vehicle structure in the head region of the passengers, notably the driver and any front-seat passenger, is of critical importance in collision-type accidents.

2. Description of the Prior Art

Numerous attempts have been made to reduce collision hazard in the head region of vehicle occupants, notably in the head region of any occupant near the windshield, i.e. driver and front-seat passengers, without detriment to other functions such as anti-glare or anti-dazzle protection. For example, it has been suggested to replace the conventional pivotable light screens or visors by retractable screens and to provide for various shock -absorbing means in the head region near the cabin roof. The following U.S. Pat. Nos. are illustrative of such prior art: 2,477,933, 2,594,867, 2,806,732, 2,843,420, 3,188,112, 3,650,542, 3,644,682, 3,687,485 and 3,721,468.

Few of these prior art suggestions that actually do provide for improved safety have found their way into practical application, probably due primarily to the relatively high costs of assembly arising from replacement of conventional roof linings by structures with improved functional effectiveness, notably in mass production.

In any case, improvements of the interior structure of automobiles so as to reduce collision hazards continue to be of great interest.

OBJECTS OF THE INVENTION

Accordingly, it is a main object of the invention to provide an improved roof lining structure for automotive vehicle cabins.

Another object is to provide for improved roof lining structures suitable for commercial assembly-line production.

Further objects are improved general safety, appearance and comfort of the cabin roof of automotive vehicles including passenger cars, trucks, buses, and the like.

Yet other objects will become apparent as the specification proceeds.

SUMMARY OF THE INVENTION

It has been found that the above and further objects can be achieved according to the invention by means of a roof lining element for automotive vehicle cabins, said element comprising a substantially self-supporting integral structure including a frame for mounting said element near an interior surface of a roof portion of said cabin, and a frame cover means firmly connected to said frame; said frame including means for receiving and guiding at least two light screens or visors movable between an inoperative retracted position within said roof lining element and an operative extracted position; said frame cover means consisting at least in part of a shock-absorbing material and substantially covering the bottom side of said frame for providing in the head region of cabin occupants an impact-protecting surface free from protruding parts of any functional devices.

According to a preferred embodiment, the frame cover means is a monolithic structure comprising a self-supporting continuous layer made of a material, such as bonded soft fibre board, plastic foam, etc. and the layer is connected to peripheral portions of said frame. When mounted in a cabin, the frame cover will be distanced by the frame from the main portion of the cabin roof and provide for a casque-type effect in the sense that the lining serves as an impact-dampening means in the head region of the passengers. In general, the roof lining element comprises at least two and preferably four or more light screens or visors, two of which are effective near the wind-screen.

With visors of the conventional pivotable type it is customary to provide for a visor mirror mounted at the inner side of the visor above the wind-screen portion near the front-seat passenger who sits next to the driver. Such a visor mirror is used as a face-mirror (as opposed to an internal back-view mirror) and can be generally said to be a personal or make-up mirror mounted on the visor. As the pivotable visor is replaced, according to the invention, by slidable (fully retractable and extractable) visors, the invention provides for a make-up mirror assembly arranged within the roof lining so that the mirror can be pulled out and pivoted into a face-reflecting position for use and pushed back into the roof lining after use. As will be understood, such a mirror assembly is suitable for replacing the conventional visor mirror without creating a potentially hazardous element in case of heavy accidents.

According to another preferred embodiment, the roof lining comprises at least two retractable lateral screens for positioning at an upper portion of side windows of the vehicle cabin so as to provide air-current deflectors when the side windows are open.

The above mentioned mirror assembly preferably comprises a substantially flat housing, a mirror support having a light-reflecting surface portion, a guiding for limited sliding motion within said housing and an elongated hinge pivotably interconnecting mirror support and guiding. The housing is dimensioned to encompass all other components of the assembly. The hinge is connected to means for arresting the mirror support in an angular position relative to the guiding. Mirror support and guiding by the hinge.

BRIEF DESCRIPTION OF THE DRAWINGS

The present invention is illustrated by way of examples and not limited in the Figures of the accompanying drawings in which like references refer to like parts and in which FIG. 1 is a perspective view of a roof lining element according to the invention;

FIGS. 1a and 1b are perspective views of the retractable and extractable light screens or visors for arrangement as front and lateral visors, respectively, in the element of FIG. 1;

FIG. 2 is a top view on the lower or bottom side of the roof lining element of FIG. 1;

DETAILED DESCRIPTION OF PREFERRED EMBODIMENTS

Figure 1C:
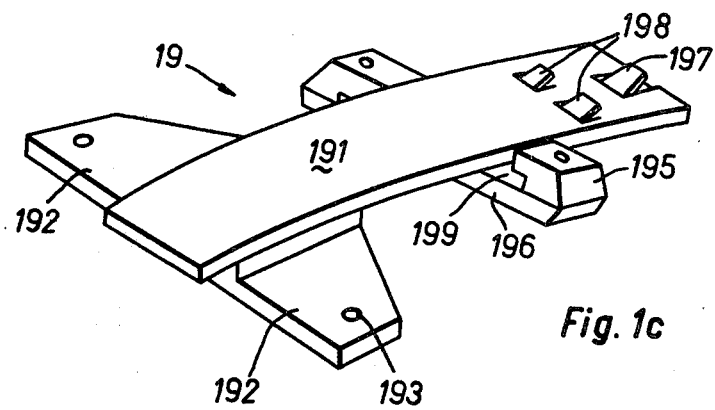
FIGS. 1c and 1d are enlarged perspective views of the guiding and arresting means for the retractable visors shown in FIGS. 1a and 1b.

Roof lining element 10 shown in FIG. 1 is an integral or monolithic prefabricated structural component including a frame 30 (shown in detail in FIG. 3) which is partially embedded in frame cover means 11. Means 31, 32, 33, 34 for receiving and guiding the slidable screens or visors 12, 14, 16, 18 form an integral part of frame 30 and are arranged slightly above cover means 11. Shape and dimensions of roof lining element 10 are adapted to the structure of the vehicle cabin that is to be provided with the inventive roof lining element.

Front visors 14, 16 are intended primarily as light screens or anti-dazzle protectors but also provide for additional impact protection, i.e. if the wind screen breaks in an accident.

One front visor 14, 16 is separately shown in FIG. 1a. Such visors are preferably made of a colored, tinted, dyed or shaded clear (i.e. transparent) synthetic plastic having the required properties in regard of strength and safety for use as a visor material (substantially non-splintering).

Conventional light-absorbing dyes including phototropic dyes and/or polarizing agents may be used in mixture with the plastic or as a coating thereon so as to provide a uniform progressive or degressive light-screening effect including automatic adaption to varying light intensities. The curvature of the front visors will depend upon the design of the wind screen of the cabin.

A lateral or side visor 14, 16 is shown in FIG. 1b. Generally, the side visors can be made of a dyed plastic material of the type used for the front visors. The lateral visors may have a plane structure. Their dimensions will in general be adapted to the dimensions of the side windows of the cabin so that the visor when extracted from the roof lining covers an upper portion of the corresponding window and is capable of acting as an air-deflector when the side window of the cabin is in a lowered position. This provides for an improved and draft-free ventilation of the vehicle cabin.

Guide means or visor guidings 31 and 32 have substantially the same structure so the design of guide 31 will be explained in more detail below.

Light screen or visor 14 is laterally supported on both of its sides in rails 310, 311 of visor guiding 31 for a sliding movement between the fully retracted and the fully or partially extracted operative position. The rails can have a U-shaped profile and be provided with internal felt linings (not shown) for contact with the visor. Visor 14 is firmly connected with a guide bracket 19 shown in FIG. 1c in a relatively enlarged perspective view. Bracket 19 is slidingly connected with top rail 315. The cross-sectional dimensions of the center bar 191 of bracket 19 are shaped to fit into the recess or guide channel of top rail 315. Further, bracket 19 is provided with two securing plates 192 having bores 193 for a bolting connection with bores 141 of visor 14. The upper face of plates 192 are offset relative to the lower face of bar 191 by the thickness of the visor.

For a sliding connection of bracket 19 with the laterally protruding portions 316 of top rail 315, bracket 19 has two laterally extending portions 196 for connection with mounting blocks 195 by bolting, clamping or the like. Thus, a recess or guide space 199 corresponding with portions 196 of top rail 315 is formed between the mounting blocks 195 and lateral portions 196.

The rear end of bracket 19 is provided with an elastic tongue 197 that normally, i.e. when not restrained by the top rail, extends above the upper face of bracket 19 so as to act as an arrester device in cooperation with a perforation 317 in top rail 315 for holding screen 14 when in the retracted position. Friction tongues 198 are provided for sliding contact with the inner side of top rail 315 so as to arrest screen 14 in an intermediary position between the fully extracted or retracted end positions that are defined when the bracket portions 196 contact the rear limiting bar 312, or when the bracket portions 192 contact the forward limiting bar 313. Such as arrangement provides for smooth guiding and safe arresting of a visor in either of the end positions or in any intermediate position.

The structure of lateral visors 12, 18 is depicted in FIG. 1b and includes two stop portions 121, 122 that limit the sliding movement of the visor in a downward direction by contact with lateral bar 333 that interconnects the two side rails 331, 332. The upper lateral bar 334 is connected with rail 331 and with side rail 310, the latter being connected in turn with rail 332.

Figure 1D:
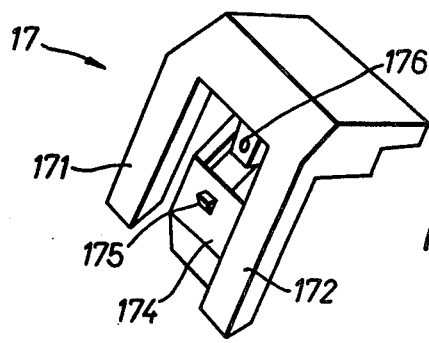

A clamp 17 shown in FIG. 1d in a relatively enlarged perspective view is provided at the rear end of side rail 310 for arresting visor 12 in its fully retracted position. A recessed part 123 is provided in visor 12, 18 for interaction with protrusion 175 of clamp 17. Preferably, clamp 17 is an integral component made of a synthetic and somewhat flexible synthetic plastic and includes two flexible prongs 171, 172 for contact with the outer surface of visor 12 when the latter is moved in guide means 31 in upward direction. Prong 174 with protrusion 175 contacts the inner surface of visor 12. A bore 176 is provided in clamp 19 for a bolting connection or the like with a corresponding bore 391 in side rail 310 of frame 30.

Figure 3:
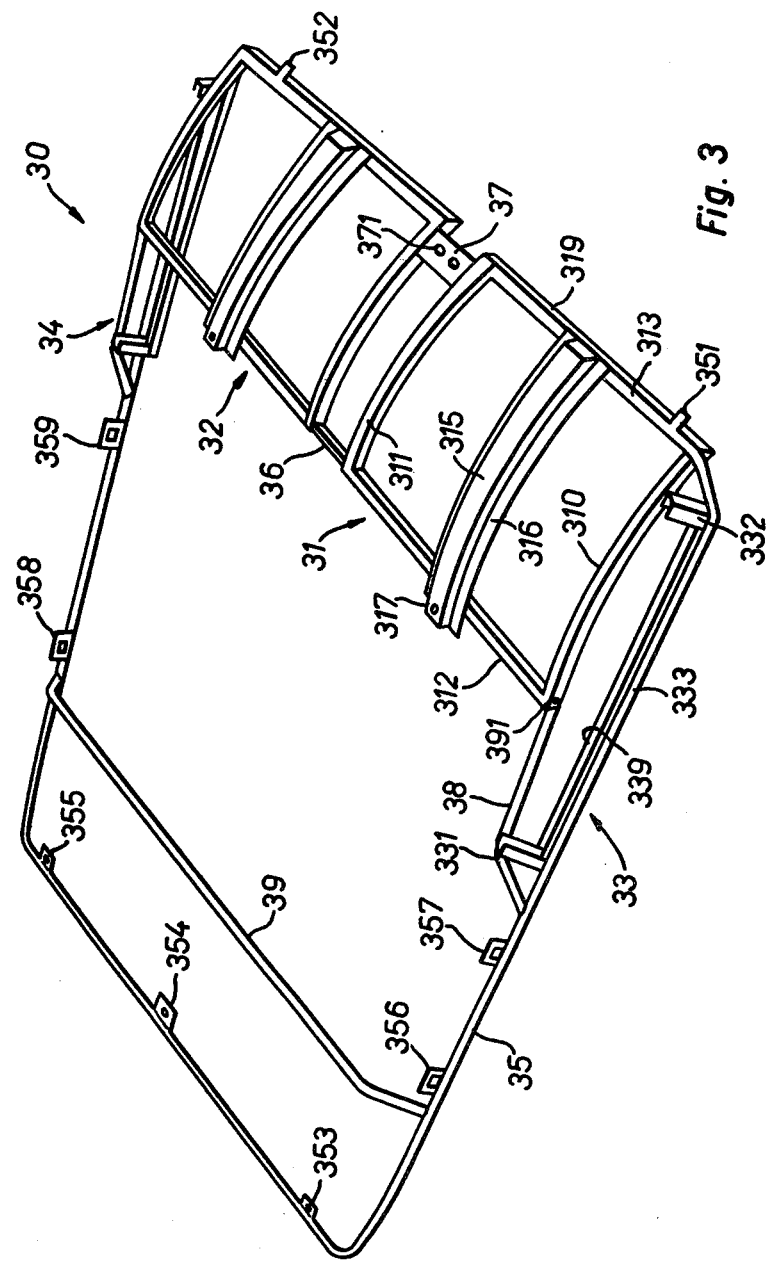
FIG. 3 is a perspective view of the frame which is a component of the roof lining element of FIG. 1.

As shown in FIG. 3, frame 30 of the inventive cabin roof lining element 10 is preferably a "closed-type" framework having a peripherically or circumferentially continuous structural connection. Conventional metallic structural materials are preferred in general for frame 30 but synthetic plastics can be used as well. The frame interconnects the visor guides 31, 32, 33, 34 by means of a circumferentially arranged frame rod 35, connecting bars 36, 37, strut 38 and an optional yoke bar 39. Depending upon the length of the frame the yoke bar that has but an auxiliar reinforcing function can be omitted, or additional yoke bars may be used. Also, additional guide means, e.g. for more than a total of two lateral visors, or for a visor on a rear cabin window, may be encompassed by the frame.

Bar 36 interconnects the rear ends of guides 31, 32 while bar 37 interconnects their front parts and is provided with bores 371 for mounting of a socket (not shown) for a rear-view mirror.

For securing roof lining 10 on a cabin vehicle roof two protrusions 351, 352 are provided at the front end of visor guides 31, 32. Further, three fishplates 353, 354, 355 are provided at the rear portion of frame 30 while two latches each 356, 357 and 358, 359 are provided at the lateral frame portions. The front end of bar 38 is connected with side rail 310 or stop bar 312 while the rear end is connected with frame bar 35. An interconnection is further provided between rail 331 and bar 38.

When according to a preferred embodiment all components of frame 30 are made of metal, such as iron, aluminum or the like, interconnection of the metallic constituents is effected by welding, e.g. spot welding.

The outer connecting bar 333 is a continuation of frame bar 35 while the inner connecting bar 339 merely extends between rails 331 and 332.

Frontal bar 313 interconnecting the front ends of rails 310, 311 at the tops thereof is part of the frame bar 35. The lower sides of the front ends of rails 310, 311 are interconnected by bar 319.

As mentioned above, metallic structural materials are preferred for the frame components but thermoplastic or duroplastic organic polymers can be used as well. Either type of material can be used in the form of profiled rods, tubes, bars, bands, and the like. Materials that can be joined by welding or cementing are preferred for the frame.

FIG. 2 depicts that side of the roof lining element of FIG. 1 that is seen by the vehicle occupants. Frame cover 11 fully extends over the lower side of frame 30 and the cabin roof provided with such lining is free from any rigid protrusions that constitute a hazard in vehicle accidents. Visors 12, 14, 16, 18 cannot be seen except when extracted. A perforation 110 can be provided in the frame cover for mounting an illumination at the cabin roof.

As mentioned before, the inventive roof lining provides for improved protection in the head region of vehicle occupants, and this is due, in part, to the integral structure of the lining element and the impact-absorbing quality of frame cover 11. Additional benefits in this respect result from additional impact protection due to the lateral zones 111, 112 and the protruding front zone 115. A recessed area 118 can be provided to receive a flat hold or the like structure for storing road maps or other articles. If a rear-view mirror is to be mounted on the roof a flat socket for easy release of the rear-view mirror in case of an accident can be secured in bores 337. Such releasable mirror arrangements are known in the art.

Interior portions of front zone 115 can be designed to receive extractable and retractable functional elements 41, 42, i.e. adding such elements without creating potentially hazardous impact areas. According to a preferred embodiment of the invention, an extractable and retractable personal "make-up" mirror is provided at 41 or/and 42 as will be explained in more detail below.

In general, the inventive roof lining element will be mounted and secured near the roof of the cabin of an automotive vehicle, preferably an automobile, so that an interspace remains between the top surface of the lining and the cabin roof. In case of an accident, such as a heavy collision or an overturning of the vehicle, the inventive roof lining will function as an impact-dampening or shock-absorbing stratum in a manner analogous to the lining of anti-crash helmets or casques used by motorcyclists. While the lining has some resilience, it will be deformed by heavy impact and increase the period of deceleration of the impacting object. In order to maximize this function, all securing elements for connecting the roof lining element with the cabin roof are provided at or near the circumference of the lining, so that substantially the entire roofing or head region of the lining is not in direct contact with the cabin roof.

By the same token, interconnection between frame and frame cover is preferably provided at or near the circumferential zones.

In a preferred method of manufacturing the inventive roof lining elements, the prefabricated frame 30 will be combined with a monolithic frame covering structure made of a fibrous mass or/and of foamed plastic to form an integral composite in which the lower side of the frame is provided with a substantially continuous surface in a distanced relation.

Suitable fibrous compositions and/or synthetic plastics compositions for the frame cover are those in the form of mono- or multi-layered strata or relatively soft boards on the basis of bonded natural or synthetic fibers, polyurethane, polyester and the like synthetic plastics with conventional and optionally reinforcing fillers, pigments, flame retardant additives, etc., including bonding agents, catalysts or blowing agents, as well as methods for processing or producing such strata in a mold-cavity or on a master are known in the art.

Such methods may be used for combining frame 30 with a frame cover 11 made of conventional soft fiber boards or foamed plastic, e.g. by embedding the circumferential frame portions in a plastic based composition prior to fully setting, curing or solidifying the latter. The frame portions that are to be embedded by the frame cover can be placed into a mold (corresponding with the surface configuration of the lower surface of the finished roof lining element where a foamable plastics composition is caused to foam and set. Alternatively, frame cover 11 can be made separately by conventional molding methods and then combined with the frame, e.g. by cementing or filling methods.

Generally, the frame cover should, at least in part, consist of a sound-absorbing, thermically insulating and shock-absorbing material. Conventional anti-impact devices of the active (self-inflating cushions or bags) or passive type (permanent anti-impact cushions) can be provided in the roof lining, if desired. For example, one or more anti-impact (i.e. decelerative) cavities can be provided in the frame cover by inserting gas-inflated tubes made of plastic film within the mold used to produce the frame cover, and embedding such tubes in a synthetic plastics foam so as to provide for segmental or continuous cavities within the cover and corresponding bead-like anti-impact protrusions in those roof regions where specific additional protection is desired, i.e. near the front end, the rear end and the side ends of the cabin roof. The lower surface of the frame cover may form the actual roof lining surface or be provided with a covering layer, e.g. a woven or nonwoven textile stratum, a poromer stratum etc., for decorative purposes.

Roof lining elements according to the invention provide general advantages in that they can be produced as prefabricated and self-supporting multi-functional entities for incorporation into automobiles on the assembly line in a one-step operation as the visors and other functional elements can be inserted into the element prior to its incorporation into an automobile. It is to be mentioned in this context that any actuating devices such as grips, handles or pull-out strips for the functional elements including the visors should be free of any rigid parts that protrude into the cabin space. It addition, automatic cleaning devices for the visors, e.g. bands or beads in resilient contact with the visors, can be provided so that the visor surface will be wiped upon pulling out or pushing in of the visors.

Figure 4:
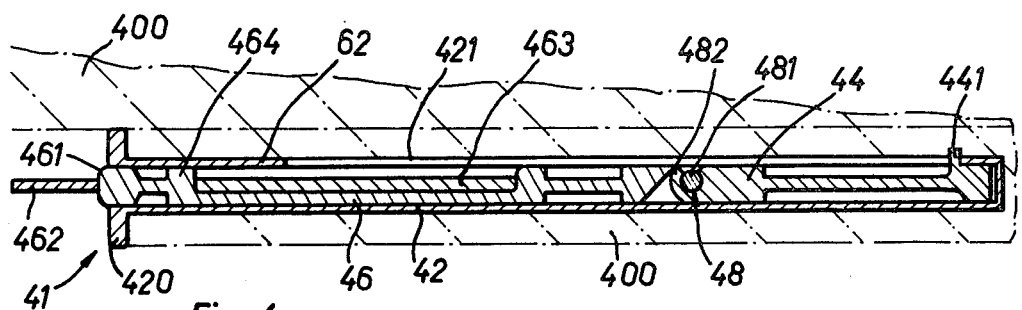
FIG. 4 is a cross-sectional view of the extractable and retractable make-up mirror assembly for arrangement within the roof lining element.

According to a preferred embodiment, the conventional visor mirror is replaced by a pull out/push in mirror assembly within the roof lining. This is illustrated in FIG. 4 showing assembly 41 in a vertical cross-sectional view (4—4 of FIG. 5) when in non-operating condition within roof lining 400 indicated by dashdotted lines. Beaded end portion 420 of the open-ended housing 42, front side 461 of the mirror support 46 and gripping strip 462 are the only visible parts of the mirror assembly when the latter is not in operative pulled-out position.

Guide means 44 is provided with two laterally protruding stop portions 441a, b (FIG. 5) slidingly guided by elongated perforations 421a, b (FIG. 6) in the top-wall portion 62 of housing 42. One end 423 of each perforation 421 constitutes the stopping point for portion 441 so that the pull-out length of mirror support 46 is limited by guide 44.

Figure 5:
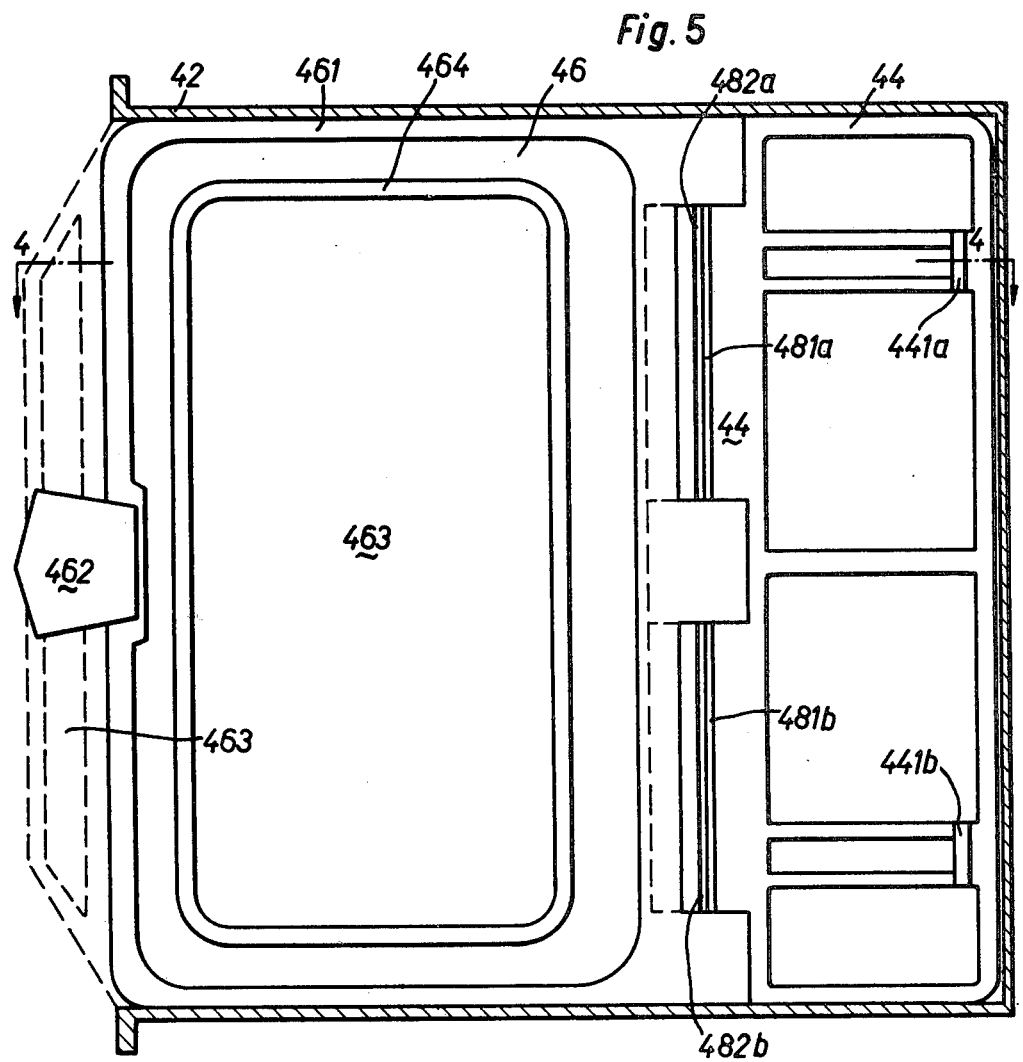
FIG. 5 is a top view of the mirror assembly shown in FIG. 4 with the casing top removed.

A linear hinge interconnecting support 46 and guide 44 is formed by two axles 481a, b rigidly connected with support 46 and movably connected with axle clamps or supports 482a, b formed as integral parts of guide 44. The cross-sections of axles 481a, b are polygonal, ribbed or grooved so as to form a plurality, e.g. 10–20, of edges or protrusions in a paraxial alignment with axles 481. These edges cooperate with clamps 482 so that a desired angular position of support 46 relative to guide 44 can be arrested. The arresting device is thus formed by the profiled axle or axles and the axle support or supports in clamping relation to the axle or axles. The extracted or pulled-out position of mirror support 46 at an angle relative to guide 44 is indicated in FIG. 5 as a perspective view in broken lines.

For reasons of economy and weight minimization both the mirror support 46 and the guide 44 are profiled plates in which the plate thickness required for optimum sliding guidance within casing 42 is provided in portions of the plates only. Thus, mirror support 46 is provided with relatively thick peripheral portions 461, 464 that encompass a reflective surface 463, the actual mirror, like a frame. The reflective surface can be a conventional glass or metal mirror cemented on support 46. In order to minimize production costs, each component of the mirror assembly except the reflective surface (support 46, guide plate 44 and casing 42) is made as a monolithic structure of a thermoplastic polymer composition, e.g. by injection molding.

Figure 6:
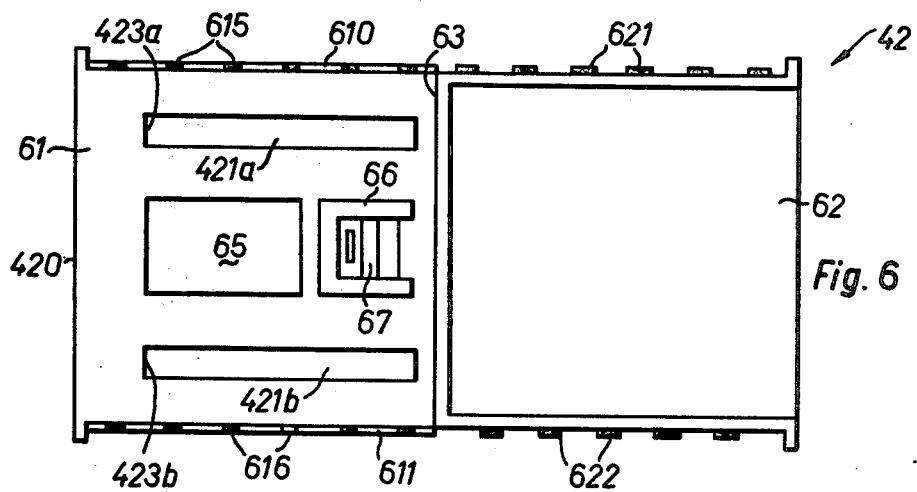
FIG. 6 is a top view, shown in a somewhat reduced scale, of the integral plastic molding that forms the casing of the mirror assembly of FIGS. 4 and 5.

FIG. 6 illustrates the monolithic structure of casing 42 in a top view shown in a slightly reduced scale and prior to folding top wall portion 61 and bottom wall portion 62 along folding line 63. Thus, the mirror assembly can be made simply by pressing axles 481 of support 46 into axle support 482, placing these interconnected parts (the reflective surface having been adhered or cemented onto the support) into the unfolded casing of FIG. 6. For closing the casing portions top wall 61 is provided with edge portions 610, 611, each having a plurality of protruding hooks for interlocking engagement with corresponding lock openings 621, 622 in the lateral edge portion of bottom wall 62.

Top wall 61 is further provided with a tongue 67 capable of being bent out for securing of the completed mirror assembly within a recess (e.g. 40, FIG. 2) of the roof lining element.

Examples of thermoplastic polymers suitable for producing the constituents of the mirror assembly (except the mirror surface) are polyolefins, ABS-resin and the like non-brittle (at ambient temperatures) plastics of the type suitable for other plastic components of the roof lining element.

What I claim is:

1. A roof lining element for an automotive vehicle cabin, said element comprising a substantially self-supporting intergral composite structure including a frame for mounting said element near an interior surface of a roof portion of said cabin, and a frame cover means; said frame including means for receiving and guiding at least two light screens or visors slidably movable between an inoperative retracted or pushed-in position within said roof lining element and an operative extracted or pulled-out position; said frame cover means consisting at least in part of a shock-absorbing material and substantially covering the bottom side of said frame for providing in the head region of cabin occupants an impact-protecting surface free from protruding parts of functional devices.

2. The roof lining element of claim 1, wherein said frame cover means is a monolithic structure comprising a self-supporting stratum made of a material selected from the group consisting of shock-absorbing fibrous and foamed materials, said stratum being connected to peripheral portions of said frame.

3. The roof lining element of claim 1 comprising at least two frontal light screens or visors movable between an inoperative retracted position within said roof lining element and an extracted operative position; said screens being dimensioned for covering a portion of the wind screen of said vehicle cabin.

4. The roof lining element of claim 1, wherein the lower surface of said frame cover means is shaped to provide two lateral impact-protecting regions and a forward impact-protecting region.

5. The roof lining element of claim 4, wherein at least one additional retractable functional element is provided within said forward impact-protecting region.

6. A roof lining element for an automotive vehicle cabin, said element comprising a substantially self-supporting integral composite structure including a frame for mounting said element near an interior surface of a roof portion of said cabin, and a frame cover means; said frame including means for receiving and guiding at least two light screens or visors movable between an inoperative retracted or pushed-in position within said roof lining element and an operative extracted or pulled-out position; said frame cover means consisting at least in part of a shock-absorbing material and substantially covering the bottom side of said frame for providing in the head region of cabine occupants an impact-protecting surface free from protruding parts of functional devices, wherein the lower surface of said frame cover means is shaped to provide two lateral impact-protecting regions and a forward impact-protecting region, wherein at least one additional retractable functional element is provided within said forward impact-protecting region, wherein said additional functional element is a makeup mirror assembly for use by a front-seat passenger.

7. A roof lining element for an automotive vehicle cabin, said element comprising a substantially self-supporting integral composite structure including a frame for mounting said element near an interior surface of a roof portion of said cabin, and a frame cover means; said frame including means for receiving and guiding at least two screen or visor means slidably movable between an inoperative retracted or pushed-in position within said roof lining element and an operative extracted or pulled-out position; said frame cover means consisting at least in part of a shock-absorbing material and substantially covering the bottom side of said frame for providing in the head region of cabin occupants an impact-protecting surface free from protruding parts of functional devices, wherein said screen or visor means comprise at least two retractable lateral screens or visors for positioning at an upper portion of side windows of said cabin and for providing air-current deflectors when said side windows are in an opened position.

8. A roof lining element for an automotive vehicle cabin, said element comprising a substantially self-supporting integral composite structure including a frame for mounting said element near an interior surface or a roof portion of said cabin, and a frame cover means; said frame including means for receiving and guiding at least two light screens or visors movable between an inoperative retracted or pushed-in position within said roof lining element and an operative extracted or pulled-out position; said frame cover means consisting at least in part of a shock-absorbing material and substantially covering the bottom side of said frame for providing in the head region of cabin occupants an impact-protecting surface free from protruding parts of functional devices, comprising at least two frontal light screens or visors movable between an inoperative retracted position within said roof lining element and an extracted operative position; said screens being dimensioned for covering a portion of the wind screen of said vehicle cabin, wherein each of said means for receiving and guiding said light screens or visors comprises two lateral slide-rails and a guide-rail arranged between said slide-rails in a substantially equidistanced position.

9. The roof lining element of claim 6, wherein said mirror assembly comprises a substantially flat housing, a mirror support having a light-reflecting surface portion, a guide means for limited sliding motion within said housing, an elongated hinge means pivotably interconnecting said mirror support and said guide means; said housing being dimensioned to substantially encompass said guide means and said mirror support; and said hinge means being associated with a means for arresting said mirror support when in an angular position relative to said guide means; said mirror support and said guide means with interconnecting hinge means being operatively associated with said housing for alternatingly arranging said light-reflecting surface portion in a pushed-in inoperative position and in a pulled-out operative position.

10. The roof lining element of claim 9, wherein said elongated hinge means comprises at least one axle having a plurality of elongated surface protrusions or edges in a substantially paraxial alignment with said axle, said means for arresting being provided by at least one axle support in clamping relation with said axle.

11. The roof lining element of claim 9, wherein said guide means is provided with at least one stop portion in operative association with a slot arranged in said housing; said housing being formed by an integrally molded structure of a synthetic plastic material, said structure having a top wall portion, a bottom wall portion and lateral means for clampingly interconnecting said top wall portion and said bottom wall portion.

12. In an automotive vehicle cabin, the improvement consisting of arranging, at the interior side of a roof portion of said cabin, a composite roof lining element comprising a self-supporting and substantially rigid frame and a frame cover means connected with said frame at a peripheral portion thereof; said frame including means for receiving and guiding at least two light screens or visors slidably movable between an inoperative retracted position within said roof lining element and an operative extracted position; and said frame cover means providing a stratum of limited resilience capable of acting as a crash-shield in the head room of vehicle occupants.

13. A process of producing a roof lining element for cabins of automotive vehicles comprising the steps of forming a frame for mounting at the interior of a roof portion of said cabin; forming a monolithic frame cover means consisting substantially of a self-supporting stratum of an organic material selected from the group consisting of fibrous and foamed materials; and securing said frame cover means on said frame for providing an integral structure capable of acting as a crash-shield.

14. A process of producing a roof lining element for cabins of automotive vehicles comprising the steps of forming a frame for mounting at the interior of a roof portion of said cabin; forming a monolithic frame cover means consisting substantially of a self-supporting stratum of an organic material selected from the group consisting of fibrous and formed materials; and securing said frame cover means on said frame for providing an integral structure capable of acting as a crash-shield, wherein said frame cover means is formed in a mold including at least one gas-filled hose for incorporation thereof in said monolithic frame cover means.

* * * * *